(12) United States Patent
Harunari et al.

(10) Patent No.: US 12,409,589 B2
(45) Date of Patent: Sep. 9, 2025

(54) METAL MEMBER-POLYARYLENE SULFIDE RESIN MEMBER COMPLEX AND PRODUCTION METHOD THEREFOR

(71) Applicant: TOSOH CORPORATION, Shunan (JP)

(72) Inventors: Takeshi Harunari, Yokkaichi (JP); Naoki Yamano, Yokkaichi (JP)

(73) Assignee: TOSOH CORPORATION, Shunan (JP)

( * ) Notice: Subject to any disclaimer, the term of this patent is extended or adjusted under 35 U.S.C. 154(b) by 126 days.

(21) Appl. No.: 18/279,106

(22) PCT Filed: Feb. 8, 2022

(86) PCT No.: PCT/JP2022/004913
§ 371 (c)(1),
(2) Date: Aug. 28, 2023

(87) PCT Pub. No.: WO2022/196190
PCT Pub. Date: Sep. 22, 2022

(65) Prior Publication Data
US 2024/0140006 A1 May 2, 2024

(30) Foreign Application Priority Data

| | | |
|---|---|---|
| Mar. 17, 2021 | (JP) | 2021-043333 |
| Mar. 17, 2021 | (JP) | 2021-043336 |
| Jan. 4, 2022 | (JP) | 2022-000312 |

(51) Int. Cl.
*B29C 45/14* (2006.01)
*B29C 45/00* (2006.01)
(Continued)

(52) U.S. Cl.
CPC .... *B29C 45/14311* (2013.01); *B29C 45/0001* (2013.01); *B29C 66/7422* (2013.01);
(Continued)

(58) Field of Classification Search
CPC ... B29C 65/70; B29C 2045/467; B29C 45/10; B29C 45/16; B29C 2045/135;
(Continued)

(56) References Cited

U.S. PATENT DOCUMENTS

2024/0140006 A1  5/2024  Harunari et al.

FOREIGN PATENT DOCUMENTS

| JP | 4020957 B2 | 12/2007 |
|---|---|---|
| JP | 2014-136366 A | 7/2014 |

(Continued)

OTHER PUBLICATIONS

International Search Report for PCT/JP2022/004913 dated Mar. 8, 2022 (PCT/ISA/210).
(Continued)

*Primary Examiner* — Stella K Yi
(74) *Attorney, Agent, or Firm* — Sughrue Mion, PLLC

(57) ABSTRACT

A metal member—polyarylene sulfide resin member complex superior in airtightness between the metal member and the polyarylene sulfide (PAS) resin member and a production method therefor, in which the complex comprises a metal member and a PAS member combined together into a one-piece shaped article by injection molding and satisfies conditions 1) and 2) as described, and the PAS resin member contains a PAS resin and a modified ethylene copolymer.

10 Claims, 2 Drawing Sheets

(51) Int. Cl.
    *B29C 65/00*     (2006.01)
    *B29K 23/00*     (2006.01)
    *B29K 81/00*     (2006.01)
    *B29L 31/00*     (2006.01)
    *B29L 31/30*     (2006.01)
    *C08G 75/0254*     (2016.01)
    *C08L 23/0869*     (2025.01)

(52) U.S. Cl.
    CPC ...... *C08G 75/0254* (2013.01); *C08L 23/0869* (2013.01); *B29K 2023/08* (2013.01); *B29K 2081/04* (2013.01); *B29K 2905/02* (2013.01); *B29L 2031/30* (2013.01); *B29L 2031/712* (2013.01)

(58) Field of Classification Search
    CPC ... B29C 31/04; B29C 31/006; B29C 66/7422; B29C 45/0001; B29C 45/14311; C08L 23/0869; C08G 75/0254
    See application file for complete search history.

(56) References Cited

FOREIGN PATENT DOCUMENTS

| | | |
|---|---|---|
| JP | 5701414 B1 | 4/2015 |
| JP | 5714193 B1 | 5/2015 |
| JP | 2016-044303 A | 4/2016 |
| JP | 2019-147250 A | 9/2019 |
| JP | 2020-001271 A | 1/2020 |
| JP | 2020-68070 A | 4/2020 |
| JP | 6819798 B2 | 1/2021 |
| JP | 2022-145492 A | 10/2022 |
| WO | 2020/075802 A1 | 4/2020 |

OTHER PUBLICATIONS

Written Opinion for PCT/JP2022/004913 dated Mar. 8, 2022 (PCT/ISA/237).
International Preliminary Report on Patentability dated Sep. 12, 2023 with a Translation of the Written Opinion of the International Searching Authority in Application No. PCT/JP2022/004913.
Communication issued on Jan. 29, 2025 from the European Patent Office for European Patent Application No. 22 77 0949.

METAL MEMBER-POLYARYLENE SULFIDE RESIN MEMBER COMPLEX AND PRODUCTION METHOD THEREFOR

CROSS REFERENCE TO RELATED APPLICATIONS

This application is a National Stage of International Application No. PCT/JP2022/004913 filed Feb. 8, 2022, claiming priorities based on Japanese Patent Application No. 2021-043333 filed Mar. 17, 2021, Japanese Patent Application No. 2021-043336 filed Mar. 17, 2021 and Japanese Patent Application No. 2022-000312 filed Jan. 4, 2022, all of which are incorporated by reference in their entirety.

TECHNICAL FIELD

The present invention relates to a metal member-polyarylene sulfide resin member complex superior in airtightness at the bonding interface and a production method for it. More specifically, the present invention relates to a metal member-polyarylene sulfide resin member complex superior in airtightness between the metal member and the polyarylene sulfide resin member that is superior in impact resistance, lightness and suitability for mass production and is particularly useful in the application of components of transport equipment, such as automobiles and aircraft, or in the application of electric/electronic components, for example of mobile phones, in which waterproofness is needed, and to a production method for a metal member-polyarylene sulfide resin member complex.

BACKGROUND ART

As a way to reduce the weight of components of transport equipment, such as automobiles and aircraft, a method of replacing part of metal with resin has been studied. As a method for combining resin and metal into a one-piece complex, furthermore, the method of directly combining them by inserting a metal member having a physically and/or chemically treated surface into a mold and shaping the resin by injection molding (hereinafter also referred to as insert injection molding) has been attracting attention owing to its good productivity in mass production, small number of components involved, low cost, high flexibility in designing and low environmental impact. This method has been proposed for, for example, production processes for mobile electronic devices, such as smartphones (See, for example, Patent Documents 1 to 3.).

Polyarylene sulfides (Hereinafter also abbreviated to PASs.), typically poly(p-phenylene sulfide) (Hereinafter also abbreviated to PPS.), have excellent mechanical properties, thermal properties, electrical properties and chemical resistance and are used in a broad range of applications including a variety of members in electrical/electronic equipment and members in automotive equipment as well as members in office equipment.

By virtue of being superior melt flowability, furthermore, PASs exhibit excellent bond strength in insert injection molding with a metal member having a physically and/or chemically treated surface.

Incidentally, atomic force microscopes or confocal laser scanning microscopes are commonly used as a method for measuring the surface roughness of a roughened surface of metal through surface analysis of the roughened surface (See, for example, Patent Documents 4 and 5.).

Moreover, proposals have been made regarding metal-resin complex structures superior in airtightness at the metal-resin bonding interface (See, for example, Patent Document 6.)

PRIOR ART DOCUMENTS

Patent Documents

Patent Document 1: Japanese Patent No. 5701414
Patent Document 2: Japanese Patent No. 5714193
Patent Document 3: Japanese Patent No. 4020957
Patent Document 4: JP-A-2014-136366
Patent Document 5: Japanese Patent No. 6819798
Patent Document 6: JP-A-2020-68070

DISCLOSURE OF INVENTION

Technical Problem

For the metal member-resin member complexes proposed in Patent Documents 1 to 3, obtained through insert injection molding, bond strength is used to quantify adhesion at the metal-resin bonding interface and to determine how good the adhesion is. Even when the bond strength is excellent, however, it does not necessarily mean that the complex is superior in airtightness at the metal-resin bonding interface. As for the complex structures proposed in Patent Documents 4 and 5, nothing has been investigated on airtightness at the metal-resin bonding interface. The cooling apparatus and battery structure proposed in Patent Document 6, furthermore, have excellent airtightness, but the mechanism behind the airtightness is not clear. There has been a desire for quantitative modeling of the mechanism behind the airtightness.

An object of the present invention, therefore, to provide a metal member-polyarylene sulfide resin member complex superior in airtightness between the metal member and the polyarylene sulfide resin member and a method for stable production of a metal member-polyarylene sulfide resin member complex superior in airtightness.

Solution to Problem

After extensive research to solve the above problem, the inventors found as follows. A metal member-polyarylene sulfide resin member complex that comprises a polyarylene sulfide resin member made from a particular polyarylene sulfide resin and a surface-roughened metal member, for which the difference between the surface roughness of the metal member and the surface roughness of the polyarylene sulfide resin member at the bonding interface between the metal member and the polyarylene sulfide resin member is equal to or smaller than a certain proportion, is markedly superior in adhesion at the bonding interface between the metal member and the polyarylene sulfide resin member because the bonding surface of the polyarylene sulfide resin member copies microscopic irregularities in the roughened surface of the metal member with high accuracy. As a result of this, furthermore, the complex has excellent airtightness, is superior in reliability for airtightness and gives members, components, products, etc., superior in impact resistance, lightness and suitability for mass production. Based on these findings, the inventors completed the present invention.

That is, the present invention lies in the following [1] to [10].

[1] A metal member-polyarylene sulfide resin member complex comprising a metal member and a polyarylene sulfide resin member combined together into a one-piece shaped article by injection molding, wherein (1) and (2) below are satisfied.

(1); Arithmetic mean roughness (Ra1), maximum height roughness (Rz1) and root mean square height (Rq1) of a surface of the metal member in a measurement according to JIS B 0601-2001 performed using an atomic force microscope set to a field of view range of 2 μm or a confocal laser scanning microscope, and arithmetic mean roughness (Ra2), maximum height roughness (Rz2) and root mean square height (Rq2) of a surface of the polyarylene sulfide resin member in a measurement according to JIS B 0601-2001 performed using an atomic force microscope set to a field of view range of 2 μm or a confocal laser scanning microscope, satisfy a relationship or relationships of $|(Ra1-Ra2)|/(Ra1+Ra2) \leq 0.2$, $|(Rz1-Rz2)|/(Rz1-Rz2) \leq 0.2$ and/or $|(Rq1-Rq2)|/(Rq1+Rq2) \leq 0.2$.

(2) The polyarylene sulfide resin member contains a polyarylene sulfide resin and a modified ethylene copolymer.

[2] The metal member-polyarylene sulfide resin member complex according to [1], wherein the modified ethylene copolymer is at least one modified ethylene copolymers selected from the group consisting of ethylene-α,β-unsaturated alkyl carboxylate-maleic anhydride copolymers, ethylene-α,β-unsaturated glycidyl carboxylate copolymers, ethylene-α,β-unsaturated glycidyl carboxylate-vinyl acetate copolymers, ethylene-α,β-unsaturated glycidyl carboxylate-α,β-unsaturated alkyl carboxylate copolymers and maleic anhydride-grafted ethylene-α-olefin copolymers.

[3] The metal member-polyarylene sulfide resin member complex according to [1] or [2], wherein (3) below is further satisfied.

(3); The maximum height roughness (Rz1) of the surface of the metal member in a measurement according to JIS B 0601-2001 performed using an atomic force microscope set to a field of view range of 2 μm is 800 nm or less.

[4] The metal member-polyarylene sulfide resin member complex according to any of [1] to [3], wherein the metal member is a metal member having a chemically treated surface.

[5] The metal member-polyarylene sulfide resin member complex according to [1] or [2], wherein (4) below is further satisfied.

(4); The maximum height roughness (Rz1) of the surface of the metal member in a measurement according to JIS B 0601-2001 performed using a confocal laser scanning microscope exceeds 800 nm.

[6] The metal member-polyarylene sulfide resin member complex according to [5], wherein the metal member is a metal member having a physically treated surface.

[7] A production method for the metal member-polyarylene sulfide resin member complex according to any of [1] to [6], the method comprising installing a metal member in a mold and injecting and filling a molten polyarylene sulfide resin into the mold to produce a one-piece insert-injected complex in which the metal member and a polyarylene sulfide resin member have been directly combined together.

[8] The production method according to [7] for a metal member-polyarylene sulfide resin member complex, wherein the insert injection molding is performed under conditions of a mold temperature of 130° C. or above and a mold hold pressure of 1 MPa or more.

[9] A container comprising the metal member-polyarylene sulfide resin member complex according to any of [1] to [6] as a lid thereof.

[10] The container according to [9], wherein the container is a highly airtight container.

Advantageous Effects of Invention

According to the present invention, there can be provided a highly reliable metal member-polyarylene sulfide resin member complex that is superior in airtightness at the bonding interface and in impact resistance, lightness and suitability for mass production and is particularly useful in the application of components of transport equipment, such as automobiles and aircraft, or in the application of electric/electronic components, for example of mobile phones, in which waterproofness is needed, and a production method for it. The industrial value is extremely high.

DESCRIPTION OF EMBODIMENTS

Figure 1:
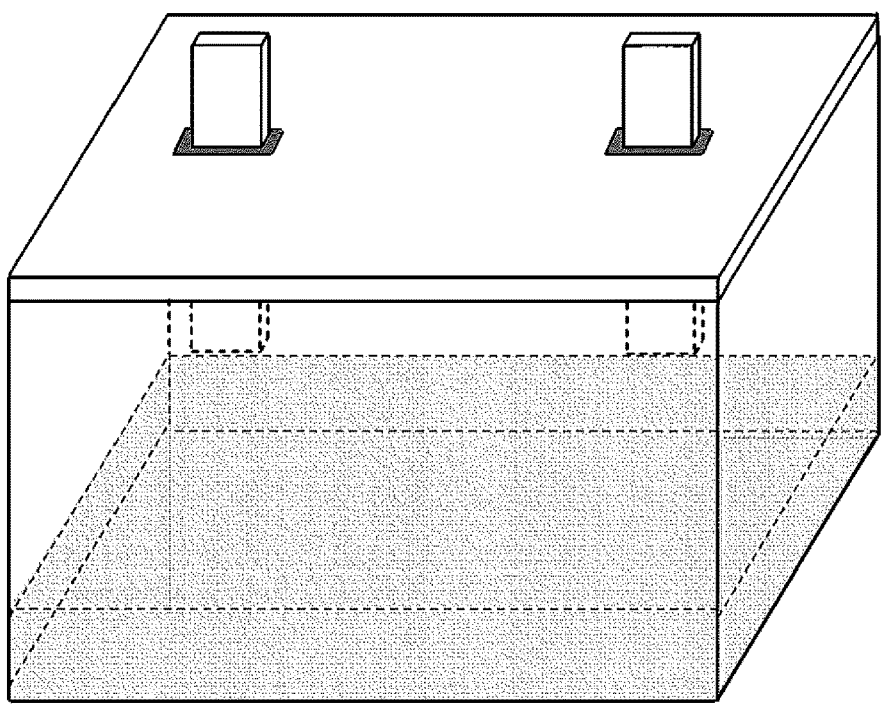
FIG. 1; A schematic diagram of a container for airtightness evaluation used in the Examples.

The present invention will now be described in detail.

A metal member-polyarylene sulfide resin member complex according to the present invention is a metal member-polyarylene sulfide resin member complex comprising a metal member and a polyarylene sulfide resin member directly combined together by injection molding.

A surface of the metal member and a surface of the polyarylene sulfide resin member, furthermore, satisfy at least one of the relationships of (1-1) to (1-3) below. As a result of this, the metal member-polyarylene sulfide resin member complex has excellent airtightness.

(1-1) The maximum height roughness of the surface of the metal member in a measurement according to JIS B 0601-2001 performed using an atomic force microscope set to a field of view range of 2 μm or a confocal laser scanning microscope (Hereinafter also written as Rz1.) and the maximum height roughness of the surface of the polyarylene sulfide resin member in a measurement according to JIS B 0601-2001 performed using an atomic force microscope set to a field of view range of 2 μm or a confocal laser scanning microscope (Hereinafter also written as Rz2.) satisfy $|(Rz1-Rz2)|/(Rz1+Rz2) \leq 0.2$. The polyarylene sulfide resin member for the measurement with an atomic force microscope or a confocal laser scanning microscope can be prepared by dissolving the metal member alone out of the metal member-polyarylene sulfide resin member complex and leaving the polyarylene sulfide resin member undissolved. Its bonding surface can be measured as the surface of the member.

(1-2) The arithmetic mean roughness of the surface of the metal member in a measurement according to JIS B 0601-2001 performed using an atomic force microscope set to a field of view range of 2 μm or a confocal laser scanning microscope (Hereinafter also written as Ra1.) and the arithmetic mean roughness of the surface of the polyarylene sulfide resin member in a measurement according to JIS B 0601-2001 performed using an atomic force microscope set to a field of view range of 2 μm or a confocal laser scanning microscope (Hereinafter also written as Ra2.) satisfy $|(Ra1-Ra2)|/(Ra1+Ra2) \leq 0.2$.

(1-3) The root mean square height of the surface of the metal member in a measurement according to JIS B 0601-2001 performed using an atomic force microscope set to a field of view range of 2 μm or a confocal laser scanning microscope (Hereinafter also written as Rq1.) and the root mean square height of the surface of the polyarylene sulfide resin member in a measurement according to JIS B 0601-2001 performed using an atomic force microscope set to a field of view range of 2 μm or a confocal laser scanning microscope (Hereinafter also written as Rq2.) satisfy $|(Rq1-Rq2)|/(Rq1+Rq2) \leq 0.2$.

Rz1, Rz2, Ra1, Ra2, Rq1 and Rq2 can be measured at three or more randomly chosen points and determined as averages. The field of view range observed using a confocal laser scanning microscope can be selected as appropriate, for example according to the shape and dimensions of the metal member-polyarylene sulfide resin member complex and the size of the irregularities in the metal surface formed by surface roughening. For example, a range from 100 μm to 2000 μm is selected.

The method for dissolving the metal member alone out of the metal member-polyarylene sulfide resin member complex, furthermore, may be any method. The method of immersing the metal member-polyarylene sulfide resin member complex in an acidic liquid, such as hydrochloric acid, is particularly preferred because it allows for efficient dissolution of the metal member alone. After the dissolution of the metal member, it is preferred to wash the polyarylene sulfide resin member with purified water, dry the washed resin member and then observe the bonding surface.

Airtightness in the present invention refers to airtightness at a bonding interface between a metal member and a polyarylene sulfide resin member to substances such as water, water vapor, organic solvents; e.g., acetone, ethanol, dimethylformamide, tetrahydrofuran, ethyl acetate and ammonia, fluids for vehicles; e.g., automatic transmission fluid, long-life coolant, battery fluid, engine oil, gasoline, diesel fuel, gear oil, brake fluid and silicone oil, gases; e.g., helium, hydrogen, oxygen, nitrogen, air, carbon dioxide, ozone, methane, carbon monoxide, liquefied petroleum gas, hydrogen peroxide and hydrogen fluoride, and electrolytes for batteries. The evaluation method for airtightness can be selected as appropriate according to applications and purposes. An example of a helium leak test is the method proposed in JP-A-2020-68070.

The metal member that constitutes the metal member-polyarylene sulfide resin member complex according to the present invention may be a member made of any material as long as it belongs to the category of metal members. Of such metal members, ones that are aluminum, aluminum alloy, copper, copper alloy, magnesium, magnesium alloy, iron, titanium, titanium alloy or stainless steel members are particularly preferred because they can be used in various applications after being made into a complex with a polyarylene sulfide resin member. In particular, ones that are aluminum, aluminum alloy, magnesium, magnesium alloy, titanium, titanium alloy, copper or copper alloy members, superior in weight reduction, are preferred. More preferably, the metal member is an aluminum, aluminum alloy, copper or copper alloy member. The metal member, furthermore, may be a rolled, drawn or extruded material, typically a plate, may be a cast material, typically a die-cast material, or may be a metal member that is a forged material.

The metal member, furthermore, is preferably a metal member that has had its surface physically and/or chemically treated. The physical and/or chemical treatment allows the metal member to give a metal member-polyarylene sulfide resin member complex superior in, for example, airtightness after being directly combined with the polyarylene sulfide resin member.

As for the method for physically and/or chemically treating the surface of the metal member, any method that makes a surface of the metal member roughened can be used to perform the physical and/or chemical treatment. Examples of chemical treatments include anodizing treatment and the method of chemically treating the surface with an aqueous solution of an acid or alkali. The anodizing treatment may be by, for example, the method of forming an oxide coating on the surface of the metal member through electrification reaction in an electrolytic solution with the metal member as an anode and can be performed using the process commonly known as anodization in fields such as plating. More specific examples include 1) DC electrolysis, in which electrolysis is performed with an applied constant DC voltage, and 2) bipolar electrolysis, in which electrolysis is performed by applying a voltage that is a superposition of an AC component on a DC component. Specific examples of anodization processes include methods proposed in, for example, WO 2004/055248. The method of chemically treating the surface with an aqueous solution of an acid or alkali may be, for example, the method of chemically treating the surface of the metal member by immersing the metal member in the aqueous solution of an acid or alkali. The aqueous solution of an acid or alkali in that case, may, for example, be a phosphoric acid compound, such as phosphoric acid; a chromic acid compound, such as chromic acid; a hydrofluoric acid compound, such as hydrofluoric acid; a nitric acid compound, such as nitric acid; a hydrochloric acid compound, such as hydrochloric acid; a sulfuric acid compound, such as sulfuric acid; an alkali aqueous solution, such as a sodium hydroxide or ammonia aqueous solution; a triazine thiol aqueous solution or a triazine thiol derivative aqueous solution. More specific examples include methods proposed in, for example, JP-A-2017-132243, JP-A-2019-188651, WO 2008/133296, Japanese Patent No. 5622785, JP-A-10-096088, JP-A-10-056263, JP-A-04-032585, JP-A-04-032583, JP-A-02-298284, WO 2009/151099 and WO 2011/104944. When, in particular, the metal member is made into one having a microscopically roughened surface, the method of chemically treating the surface is preferred. The metal member, furthermore, is preferably one that has had its surface microscopically roughened by the method of chemically treating the surface, preferably one for which (3) the Rz1 of the surface of the metal member in a measurement according to JIS B 0601-2001 performed using an atomic force microscope set to a field of view range of 2 μm is 800 nm or less.

As for the physical treatment, examples include the method of bringing fine solid particles into contact or collision with the surface and the method of irradiating the surface with high-energy electromagnetic radiation. More specific examples include sandblasting treatment, liquid honing treatment and laser machining treatment. Examples of abrasives in sandblasting or liquid honing treatment include sand, steel grid, steel shot, cut wires, alumina, silicon carbide, metal slag, glass beads and plastic beads. Examples of laser machining treatments include ones by the methods proposed in WO 2007/072603 and JP-A-2015-142960. When, in particular, a surface of the metal member is made into a roughened surface having relatively large holes, either of the chemical or physical treatment of the metal surface is possible, and the method of physically treating the surface is particularly preferred because it allows for efficient treatment. It is, furthermore, preferred that (4) the Rz1 of the surface of the metal member in a measurement according to JIS B 0601-2001 performed using a confocal laser scanning microscope exceeds 800 nm.

The polyarylene sulfide resin member that constitutes the metal member-polyarylene sulfide resin member complex according to the present invention, contains a polyarylene sulfide resin and a modified ethylene copolymer. The polyarylene sulfide resin contained may be any resin that belongs to the category commonly referred to as polyarylene sulfide resins. Examples of polyarylene sulfide resins include homopolymers or copolymers formed by p-phenylene sulfide units, m-phenylene sulfide units, o-phenylene sulfide units, phenylene sulfide sulfone units, phenylene sulfide ketone units, phenylene sulfide ether units and/or biphenylene sulfide units, and specific examples of polyarylene sulfide resins include poly(p-phenylene sulfide), polyphenylene sulfide sulfone, polyphenylene sulfide ketone and polyphenylene sulfide ether. Among them, poly(p-phenylene sulfide) is particularly preferred because it makes the polyarylene sulfide resin member especially superior in heat resistance and strength properties.

The polyarylene sulfide resin, furthermore, is preferably a polyarylene sulfide resin whose melt viscosity measured using a Koka-type flow tester fitted with a 1-mm diameter and 2-mm long die under the conditions of a measurement temperature of 315° C. and a load of 10 kg is from 50 to 2000 poises because it allows a metal member-polyarylene sulfide resin member complex superior in airtightness to be obtained efficiently.

As for the production method for the polyarylene sulfide resin, it can be produced by a method known as a production method for a polyarylene sulfide resin. For example, the polyarylene sulfide resin can be obtained by polymerizing an alkali metal sulfide salt and a polyhaloaromatic compound together in a polar organic solvent. Examples of polar organic solvents in that case include N-methyl-2-pyrrolidone, N-ethyl-2-pyrrolidone, cyclohexylpyrrolidone, dimethylformamide and dimethylacetamide, and examples of alkali metal sulfide salts include anhydrides or hydrates of sodium sulfide, rubidium sulfide and lithium sulfide. The alkali metal sulfide salt, furthermore, may be a product of reaction between an alkali metal hydrosulfide salt and an alkali metal hydroxide. Examples of polyhaloaromatic compounds include p-dichlorobenzene, p-dibromobenzene, p-diiodobenzene, m-dichlorobenzene, m-dibromobenzene, m-diiodobenzene, 4,4'-dichlorodiphenyl sulfone, 4,4'-dichlorobenzophenone, 4,4'-dichlorodiphenyl ether and 4,4'-dichlorodibiphenyl.

Examples of polyarylene sulfide resins, moreover, include linear-chain ones, ones polymerized with the addition of a small amount of a trihalo compound or polyhalogenated compound having more halogen atoms to have some introduced crosslink or branch structures, ones derived by modifying part and/or an end of the molecular chain of a polyarylene sulfide resin with a functional group such as a carboxyl group, metal carboxylate salt, alkyl group, alkoxy group, amino group or nitro group and ones that have undergone heating treatment in a nonoxidative inert gas, such as nitrogen, and the polyarylene sulfide resin may even be a mixture of these polyarylene sulfide resins. The polyarylene sulfide resin, furthermore, may be one in which impurities, such as sodium atoms, oligomers of the polyarylene sulfide resin, sodium chloride and sodium salts of 4-(N-methyl-chlorophenylamino)butanoates, have been decreased through washing with an acid, washing with hot water or washing treatment with an organic solvent, such as acetone or methyl alcohol.

The polyarylene sulfide resin member that constitutes the metal member-polyarylene sulfide resin member complex according to the present invention contains a modified ethylene copolymer. The modified ethylene copolymer is one that has, for example, an epoxy, maleic anhydride, carboxylic acid, amino or isocyanate group in its molecule as a functional group having reactivity, and examples include ethylene-α,β-unsaturated alkyl carboxylate-maleic anhydride copolymers, ethylene-α,β-unsaturated glycidyl carboxylate copolymers, ethylene-α,β-unsaturated glycidyl carboxylate-vinyl acetate copolymers, ethylene-α,β-unsaturated glycidyl carboxylate-α,β-unsaturated alkyl carboxylate copolymers and maleic anhydride-grafted ethylene-α-olefin copolymers. The amount of the modified ethylene copolymer is preferably from 1 to 40 parts by weight per 100 parts by weight of the polyarylene sulfide resin because this allows the metal member-polyarylene sulfide resin member complex to be one having few defects in the bonding interface and superior in impact resistance.

The polyarylene sulfide resin member is preferably one that further contains glass fiber because this makes the metal member-polyarylene sulfide resin member complex one that is particularly superior in strength and impact resistance. The glass fiber may be anything commonly referred to as glass fiber. Specific examples of glass fibers include glass fibers such as chopped strands having an average fiber diameter of 6 to 14 μm, chopped strands formed by flat glass fibers having a fiber cross-sectional aspect ratio of 2 to 4, milled fibers and rovings; silane fibers; aluminosilicate glass fibers; hollow glass fibers; and nonhollow glass fibers. Of these, chopped strands having an average fiber diameter of 6 to 14 μm or chopped strands formed by flat glass fibers having a fiber cross-sectional aspect ratio of 2 to 4 are particularly preferred because they make the metal member-polyarylene sulfide resin member complex one having especially few defects in the bonding interface and superior in impact resistance. A combination of two or more types of these glass fibers can also be used, and a glass fiber having a surface treated beforehand with an epoxy compound, isocyanate compound, silane compound, titanate compound or other functional compound or polymer may optionally be used. The amount of the glass fiber is preferably from 5 to 120 parts by weight per 100 parts by weight of the polyarylene sulfide resin because this makes the metal member-polyarylene sulfide resin member complex one having especially few defects in the bonding interface and superior in impact resistance.

The polyarylene sulfide resin member may be one to which, for example, calcium carbonate, lithium carbonate, magnesium carbonate, zinc carbonate, mica, silica, talc, clay, calcium sulfate, kaolin, wollastonite, zeolite, silicon oxide, magnesium oxide, zirconium oxide, tin oxide, magnesium silicate, calcium silicate, calcium phosphate, magnesium phosphate, hydrotalcite, glass powder, glass bubbles or glass flakes have been added. The polyarylene sulfide resin member, furthermore, may be one that contains one or more of ordinary additives known in the related art, including crystal nucleating agents, such as talc, kaolin and silica; plasticizers, such as polyalkylene oxide oligomer compounds, thioether compounds, ester compounds and organic phosphorus compounds; antioxidants; heat stabilizers; lubricants; anti-ultraviolet agents; and foaming agents. Moreover, the polyarylene sulfide resin member may be one made with one or more of thermosetting or thermoplastic resins, such as epoxy resins, cyanate resins, phenolic resins, polyimides, silicone resins, polyesters, polyamides, polyphenylene oxides, polycarbonates, polysulfones, polyether imides, polyether sulfones, polyether ketones, polyether ether ketones, polyamide-imides, polyamide elastomers, polyester elastomers and polyalkylene oxides, mixed in it.

The polyarylene sulfide resin member, furthermore, may contain a release agent for improved release from the mold and improved appearance when made into a shaped article. Polyethylene wax, polypropylene wax or a fatty acid amide wax, for example, is suitable for use as the release agent. The polyethylene or polypropylene wax can be a common and commercially available one. The fatty acid amide wax is a polycondensate formed by a higher aliphatic monocarboxylic acid, a polybasic acid and a diamine, and can be anything that belongs to this category. An example is (trade name) Light Amide WH-255 (Kyoeisha Chemical Co., Ltd.), which is a polycondensate formed by stearic acid, sebacic acid and ethylenediamine.

An example of a production method for the metal member-polyarylene sulfide resin member complex according to the present invention is the method of directly combining the metal member and the polyarylene sulfide resin member together by injection molding. Of such methods, it is particularly preferred to combine the members together by insert injection molding because it allows for efficient production of the complex. The insert injection molding can be by, for example, a method comprising installing the metal member in a mold and filling a molten polyarylene sulfide resin into the metal member to form a polyarylene sulfide resin member, thereby to produce a one-piece complex in which the metal member and the polyarylene sulfide resin member have been directly combined together. An example of a temperature at which the polyarylene sulfide resin is melted in that case is from 280° C. to 340° C. As for the molding machine when insert molding is performed, it is preferred to perform insert injection molding by using an injection molding machine because it is particularly superior in productivity. In particular, furthermore, the mold temperature when insert molding is performed is preferably 130° C. or above, particularly preferably from 140° C. to 160° C., because this allows a metal member-polyarylene sulfide resin member complex superior in airtightness to be produced efficiently. The mold hold pressure, furthermore, is preferably 1 MPa or more, particularly preferably from 30 to 100 MPa.

The metal member-polyarylene sulfide resin member complex according to the present invention combines the natures of being superior in airtightness, being superior in reliability for the airtightness and being superior in impact resistance, lightness and suitability for mass production. The complex is particularly suitable for use in the application of components of transport equipment, such as automobiles and aircraft, in which these natures and reliability are required, or in the application of electric/electronic components, for example of mobile phones, in which waterproofness is needed.

EXAMPLES

The present invention will now be specifically described with examples. The present invention, however, is by no means limited to these.

The polyarylene sulfide resins (A), modified ethylene copolymers (B), glass fibers (C) and other resin materials used in the Examples and Comparative Examples are presented below.

<Polyarylene Sulfide Resins (A)>
  A poly(p-phenylene sulfide) (Hereinafter written as PPS (A-1).): melt viscosity, 210 poises.
  A poly(p-phenylene sulfide) (Hereinafter written as PPS (A-2).): melt viscosity, 380 poises.
  A poly(p-phenylene sulfide) (Hereinafter written as PPS (A-3).): melt viscosity, 100 poises.

<Modified Ethylene Copolymers (B)>
  An ethylene-α,β-unsaturated alkyl carboxylate-maleic anhydride copolymer (B-1) (Hereinafter simply written as ethylene polymer (B-1).): SK global chemical, (trade name) BONDINE AX8390, ethylene residue units:α,β-unsaturated alkyl carboxylate residue units:maleic anhydride residue units (ratio by weight)=69.7:29:1.3.
  An ethylene-α,β-unsaturated glycidyl carboxylate-α,β-unsaturated alkyl carboxylate copolymer (B-2) (Hereinafter simply written as ethylene polymer (B-2).): SK global chemical, (trade name) LOTADER AX8700, ethylene residue units:α,β-unsaturated glycidyl carboxylate residue units:α,β-unsaturated alkyl carboxylate residue units (ratio by weight)=67:8:25.

<Glass Fibers (C)>
  Glass fiber (C-1); Owens Corning Japan KK, (trade name) RES03-TP91; fiber diameter, 10 μm; fiber length, 3 mm.
  Glass fiber (C-2); Nitto Boseki Co., Ltd.'s chopped strands, (trade name) CSG-3PA 830; fiber cross-sectional aspect ratio, 4.

<Polybutylene Terephthalate Resin (D)>
  A polybutylene terephthalate resin (Hereinafter simply written as PBT (D-1).): Mitsubishi Engineering-Plastics Corporation, (trade name) NOVADURAN 5010R5L.

<Polyamide Resin (E)>
  A polyamide 66 resin (Hereinafter simply written as PA (E-1).): Du Pont, (trade name) Zydel 101.

<Polyethylene Resin (F)>
  A low-density polyethylene resin (Hereinafter simply written as PE (F-1).): Tosoh Corporation, (trade name) PETROTHENE 249.

Synthesis Example 1 (Synthesis of PPS (A-1))

A 15-liter autoclave equipped with a stirrer was loaded with 1814 g of flake-shaped sodium sulfide (Na$_2$S·2.9H$_2$O), 48 g of a 30% sodium hydroxide solution (30% NaOHaq) and 3679 g of N-methyl-2-pyrrolidone, and 380 g of water was distilled away by gradually increasing the temperature to 200° C. with stirring under a stream of nitrogen. After cooling to 190° C., 2107 g of p-dichlorobenzene and 985 g of N-methyl-2-pyrrolidone were added, and the system was sealed under a stream of nitrogen. The temperature of this system was increased to 225° C. over 2 hours, the monomers were allowed to polymerize for 1 hour at 225° C., then the temperature was increased to 250° C. over 25 minutes, and polymerization was further performed for 3 hours at 250° C. After the polymerization, N-methyl-2-pyrrolidone was collected from the polymerization slurry under reduced pressure through a distillation operation. The temperature finally reached was 170° C., and the pressure was 4.7 kPa. Warm water at 80° C. was added to the resulting cake to make the slurry concentration 20%, the resulting slurry was washed, warm water was added in the same manner again, the temperature was increased to 175° C., and the washing of poly(p-phenylene sulfide) was performed a total of two times. The resulting polyphenylene sulfide was dried for one whole day at 105° C. Then the dried polyphenylene sulfide was loaded into batch rotary-kiln firing equipment, the temperature was increased to 240° C. in a nitrogen atmosphere, and curing treatment was performed by holding for 1 hour. Through this, PPS (A-1), having a melt viscosity of 210 poises, was obtained.

Synthesis Example 2 (Synthesis of PPS (A-2))

A 15-liter autoclave equipped with a stirrer was loaded with 1814 g of flake-shaped sodium sulfide ($Na_2S \cdot 9H_2O$), 8.7 g of particulate sodium hydroxide (100% NaOH: Wako Special Grade) and 3232 g of N-methyl-2-pyrrolidone, and 340 g of water was distilled away by gradually increasing the temperature to 200° C. with stirring under a stream of nitrogen. After cooling to 190° C., 2107 g of p-dichlorobenzene and 1783 g of N-methyl-2-pyrrolidone were added, and the system was sealed under a stream of nitrogen. The temperature of this system was increased to 225° C. over 2 hours, the monomers were allowed to polymerize for 1 hour at 225° C., then the temperature was increased to 250° C. over 25 minutes, and polymerization was performed for 2 hours at 250° C. Then 509 g of distilled water was injected into this system at 250° C., the temperature was increased to 255° C., and polymerization reaction was further performed for 1 hour. After the polymerization, N-methyl-2-pyrrolidone was collected from the polymerization slurry under reduced pressure through a distillation operation. The temperature finally reached was 170° C., and the pressure was 4.7 kPa. Warm water at 80° C. was added to the resulting cake to make the slurry concentration 20%, the resulting slurry was washed, warm water was added in the same manner again, the temperature was increased to 175° C., and the washing of poly(p-phenylene sulfide) was performed a total of two times. The resulting poly(p-phenylene sulfide) was dried for one whole day at 105° C. Through this, PPS (A-2), having a melt viscosity of 380 poises, was obtained.

Synthesis Example 3 (Synthesis of PPS (A-3))

A 15-liter autoclave equipped with a stirrer was loaded with 1814 g of flake-shaped sodium sulfide ($Na_2S \cdot 9H_2O$), 8.7 g of particulate sodium hydroxide (100% NaOH: Wako Special Grade) and 3232 g of N-methyl-2-pyrrolidone, and 339 g of water was distilled away by gradually increasing the temperature to 200° C. with stirring under a stream of nitrogen. After cooling to 190° C., 2085 g of p-dichlorobenzene and 1783 g of N-methyl-2-pyrrolidone were added, and the system was sealed under a stream of nitrogen. The temperature of this system was increased to 225° C. over 2 hours, the monomers were allowed to polymerize for 1 hour at 225° C., then the temperature was increased to 250° C. over 25 minutes, and polymerization was performed for 2 hours at 250° C. After the polymerization, N-methyl-2-pyrrolidone was collected from the polymerization slurry under reduced pressure through a distillation operation. The temperature finally reached was 170° C., and the pressure was 4.7 kPa. Warm water at 80° C. was added to the resulting cake to make the slurry concentration 20%, the resulting slurry was washed, warm water was added in the same manner again, the temperature was increased to 175° C., and the poly(p-phenylene sulfide) was washed. The resulting poly(p-phenylene sulfide) was dried for one whole day at 105° C. Through this, PPS (A-3), having a melt viscosity of 100 poises, was obtained.

Evaluation/Measurement methods for the resulting polyarylene sulfide resins and metal member-polyarylene sulfide resin member complexes are presented below.

—Measurement of the Melt Viscosity of the Polyarylene Sulfide Resins—

The measurement of melt viscosity was performed using a Koka-type flow tester (Shimadzu Corporation; trade name, CFT-500) fitted with a 1-mm diameter and 2-mm long die under the conditions of a measurement temperature of 315° C. and a load of 10 kg.

—Measurements of Rz1, Ra1 and Rq1 of the Treated Surface of the Metal Member—
(Measurement with an Atomic Force Microscope)

Using an atomic force microscope (Hitachi High-Tech Science Corporation, (trade name) E-sweep), the surface roughness of three randomly chosen points on the treated surface of the metal member was measured in a field of view range of 2 µm in accordance with JIS B 0601-2001 in the Dynamic Force Mode using a scanning tip (Olympus Corporation, (trade name) OMCL-AC200TN-R3; spring constant, 9 N/m). The surface roughness was determined as the average of the three points.
(Measurement with a Confocal Laser Scanning Microscope)

The surface roughness of three randomly chosen points on the treated surface of the metal member was measured using a confocal laser scanning microscope (Keyence Corporation, (trade name) VK-X200) in a field of view range of 1000 µm in accordance with JIS B 0601-2001. The surface roughness was determined as the average of the three points.

—Measurement of Rz2, Ra2 and Rq2 of the Bonding Surface of the Polyarylene Sulfide Resin Member—
(Measurement with an Atomic Force Microscope)

The metal member alone of the metal member-polyarylene sulfide resin member complex was dissolved by immersing the metal member in a bath with a 10% concentration aqueous solution of hydrochloric acid in it. Using an atomic force microscope (Hitachi High-Tech Science Corporation, (trade name) E-sweep), the surface roughness of three randomly chosen points on the bonding surface of the remaining, polyarylene sulfide resin member was measured in a field of view range of 2 µm in accordance with JIS B 0601-2001 in the Dynamic Force Mode using a scanning tip (Olympus Corporation, (trade name) OMCL-AC200TN-R3; spring constant, 9 N/m). The surface roughness was determined as the average of the three points.
(Measurement with a Confocal Laser Scanning Microscope)

The metal member alone of the metal member-polyarylene sulfide resin member complex was dissolved by immersing the metal member in a bath with a 10% concentration aqueous solution of hydrochloric acid in it. The surface roughness of three randomly chosen points on the bonding surface of the remaining, polyarylene sulfide resin member was measured using a confocal laser scanning microscope (Keyence Corporation, (trade name) VK-X200) in a field of view range of 1000 µm in accordance with JIS B 0601-2001. The surface roughness was determined as the average of the three points.

—Airtightness Test and the Evaluation of Airtightness—

Figure 4:
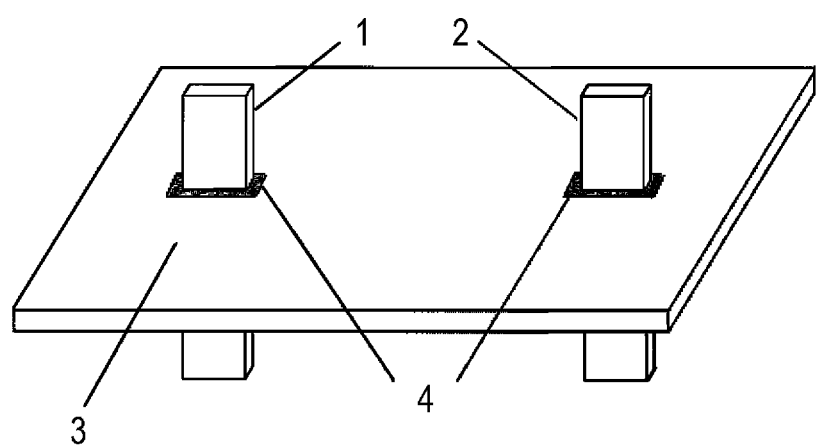
FIG. 4; A metal member-polyarylene sulfide resin member complex for airtightness evaluation.

A container for airtightness evaluation as illustrated in FIG. 1 was fabricated by putting distilled water into an aluminum container with an open top and tightly closing the container by welding together the container and a lid as illustrated in FIG. 4, which was a metal member-polyarylene sulfide resin member complex. After the container for airtightness evaluation was held at 90° C. for 200 hours, the container was returned to room temperature, and the interfaces between the metallic plates and lid and the polyarylene sulfide resin member were soaked with a liquid for inspection. The pressure inside the container was increased to 0.5 MPa, and the increased pressure was maintained for 1 minute, and seal effectiveness was evaluated.
- ○: If no bubble emerged from the interfaces soaked with the liquid for inspection, the complex was assessed as being superior in airtightness.
- x: If a bubble emerged from the interfaces soaked with the liquid for inspection, the complex was assessed as being inferior in airtightness.

Example 1

Figure 2:
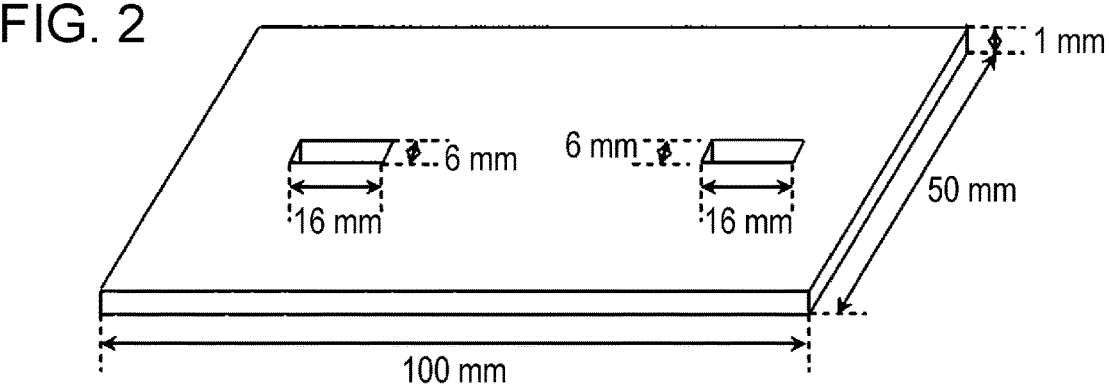
FIG. 2; A schematic diagram of a lid for airtightness evaluation.
Figure 3:
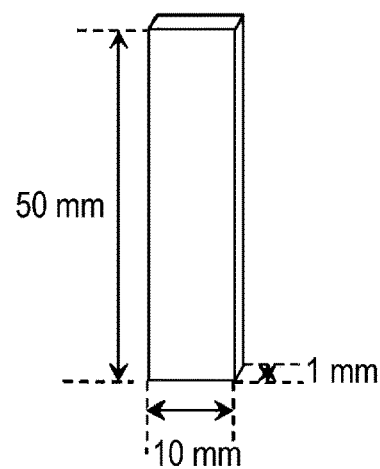
FIG. 3; A schematic diagram of a metal member for airtightness evaluation.

Aluminum alloy (A5052) plates in the shape illustrated in FIG. 3 (50 mm×10 mm×1 mm thick) and an aluminum alloy (A5052) lid in the shape illustrated in FIG. 2 were immersed for 5 minutes in a degreasing bath with an aqueous solution containing 7.5% degreasing agent for aluminum (solution temperature, 60° C.) in it and washed with deionized water. Then the plates and lid were immersed for 1 minute in a bath with an aqueous solution containing 1.5% sodium hydroxide (solution temperature, 40° C.) in it, washed with deionized water, then immersed for 1 minute in a bath with a 3% concentration aqueous solution of nitric acid (solution temperature, 40° C.) in it and washed with deionized water. Then the plates and lid were immersed for 1 minute in a bath with an aqueous solution containing 3.5% hydrazine hydrate (solution temperature, 60° C.) in it, washed with deionized water, then immersed for 3 minutes in a bath with an aqueous solution containing 0.5% hydrazine hydrate (solution temperature, 33° C.) in it, washed with deionized water and then dried in a warm-air drying oven. Through this, aluminum alloy (A5052) plates and an aluminum alloy (A5052) lid surface-roughened by chemical treatment were obtained.

11 parts by weight of ethylene copolymer (B-1) was uniformly mixed into 100 parts by weight of PPS (A-2), obtained in Synthesis Example 2, beforehand, and the resulting mixture was put into the hopper of a twin-screw extruder (The Japan Steel Works, Ltd., (trade name) TEX25αIII) heated to a cylinder temperature of 300° C. Separately, glass fiber (C-1) was put into the twin-screw extruder through the hopper of a side feeder in such a manner that the amount of the glass fiber would be 25 parts by weight per 100 parts by weight of PPS (A-2). By melting and kneading the materials together, a pelletized poly(p-phenylene sulfide) resin composition was produced.

The resulting aluminum alloy (A5052) plates and aluminum alloy (A5052) lid were set in a mold, and the poly(p-phenylene sulfide) resin composition was injection-molded using an injection molding machine (Sumitomo Heavy Industries, Ltd., (trade name) SE75S) at a cylinder temperature of 310° C. and a mold temperature of 150° C. with the mold hold pressure set to 60 MPa. Through this, insert molding into the shape illustrated in FIG. 4 was performed, and a lid that was an aluminum alloy (A5052) member-polyarylene sulfide resin member complex was produced. Then, using the resulting lid that was an aluminum alloy (A5052) member-polyarylene sulfide resin member complex, Rz1, Ra1 and Rq1 were measured with an atomic force microscope. Then, after the aluminum alloy (A5052) member alone was dissolved by immersing the complex in a bath with a 10% concentration aqueous solution of hydrochloric acid in it, Rz2, Ra2 and Rq2 of the bonding surface were measured with an atomic force microscope.

The values of $|(Rz1-Rz2)|/(Rz1+Rz2)$, $|(Ra1-Ra2)|/(Ra1+Ra2)$ and $|(Rq1-Rq2)|/(Rq1+Rq2)$ were calculated, with the result that all were 0.2 or less. Then, as a result of airtightness evaluation for the aluminum alloy (A5052) member-PPS resin member complex, the complex was found to be superior in airtightness, with no bubble formation observed. The results are presented in Table 1.

Example 2

Aluminum die-cast alloy (ADC12) plates in the shape illustrated in FIG. 3 (50 mm×10 mm×1 mm thick) and an aluminum die-cast alloy (ADC12) lid in the shape illustrated in FIG. 2 were immersed for 5 minutes in a degreasing bath with an aqueous solution containing 7.5% degreasing agent for aluminum (solution temperature, 60° C.) in it and washed with deionized water. Then the plates and lid were immersed for 1 minute in a bath with an aqueous solution containing 1.5% sodium hydroxide (solution temperature, 40° C.) in it, washed with deionized water, then immersed for 4 minutes in a bath with an aqueous solution containing a 5% concentration of hydrochloric acid and a 1% concentration of aluminum chloride hydrate (solution temperature, 40° C.) in it and washed with deionized water. Then the plates and lid were immerse for 1 minute in a bath with an aqueous solution containing a 2% concentration of ammonium monohydrogen difluoride and a 10% concentration of sulfuric acid (solution temperature, 40° C.) in it, washed with deionized water, then immersed for 4 minutes in bath with a 1.5% concentration aqueous solution of sodium hydroxide (solution temperature, 40° C.) in it, washed with deionized water, then immersed for 2 minutes in a bath with a 3% concentration aqueous solution of nitric acid (solution temperature, 40° C.) in it and washed with deionized water. Then the plates and lid were immersed for 1 minute in a bath with a 3.5% concentration aqueous solution of hydrazine hydrate (solution temperature, 60° C.) in it, washed with deionized water, then immersed for 1 minute in a bath with a 0.5% concentration aqueous solution of hydrazine hydrate (solution temperature, 33° C.) in it, washed with deionized water and then dried in a warm-air drying oven. Through this, aluminum die-cast alloy (ADC12) plates and an aluminum die-cast alloy (ADC12) lid surface-roughened by chemical treatment were obtained.

7 parts by weight of ethylene copolymer (B-1) was uniformly mixed into 100 parts by weight of PPS (A-3), obtained in Synthesis Example 3, beforehand, and the resulting mixture was put into the hopper of a twin-screw extruder (The Japan Steel Works, Ltd., (trade name) TEX25αIII) heated to a cylinder temperature of 310° C. Separately, glass fiber (C-2) was put into the twin-screw extruder through the hopper of a side feeder in such a manner that the amount of the glass fiber would be 100 parts by weight per 100 parts by weight of PPS (A-3). By melting and kneading the materials together, a pelletized poly(p-phenylene sulfide) resin composition was produced.

The resulting aluminum die-cast alloy (ADC12) plates and aluminum die-cast alloy (ADC12) lid were set in a mold, and the poly(p-phenylene sulfide) resin composition was injection-molded using an injection molding machine (Sumitomo Heavy Industries, Ltd., (trade name) SE75S) at a cylinder temperature of 310° C. and a mold temperature of 150° C. with the mold hold pressure set to 50 MPa. Through this, insert molding into the shape illustrated in FIG. 4 was performed, and a lid that was an aluminum die-cast alloy (ADC12) member-polyarylene sulfide resin member complex was produced. Then, using the resulting lid that was an aluminum die-cast alloy (ADC12) member-polyarylene sulfide resin member complex, Rz1, Ra1 and Rq1 were measured with an atomic force microscope. Then, after the aluminum die-cast alloy (ADC12) member alone was dissolved by immersing the complex in a bath with a 10% concentration aqueous solution of hydrochloric acid in it, Rz2, Ra2 and Rq2 of the bonding surface were measured with an atomic force microscope.

The values of |(Rz1−Rz2)|/(Rz1+Rz2), |(Ra1−Ra2)+/(Ra1+Ra2) and |(Rq1−Rq2)|/(Rq1+Rq2) were calculated, with the result that all were 0.2 or less. Then, as a result of airtightness evaluation for the aluminum die-cast alloy (ADC12) member-PPS resin member complex, the complex was found to be superior in airtightness, with no bubble formation observed. The results are presented in Table 1.

Example 3

Stainless steel (SUS316) plates in the shape illustrated in FIG. 3 (50 mm×10 mm×1 mm thick) and a stainless steel (SUS316) lid in the shape illustrated in FIG. 2 were immersed for 5 minutes in a degreasing bath with an aqueous solution containing 7.5% degreasing agent for aluminum (solution temperature, 60° C.) in it and washed with deionized water. Then the plates and lid were immersed for 1 minute in a bath with an aqueous solution containing 1.5% sodium hydroxide (solution temperature, 40° C.) in it, washed with deionized water, then immersed for 3 minutes in a bath with a 10% concentration aqueous solution of sulfuric acid (solution temperature, 65° C.) in it and washed with deionized water. Then the plates and lid were immersed for 3 minutes in a 3% aqueous solution of nitric acid (solution temperature, 40° C.). Then the immersed workpieces were washed with deionized water and subsequently dried in a warm-air drying oven. Through this, stainless steel (SUS316) plates and a stainless steel (SUS316) lid surface-roughened by chemical treatment were obtained.

8 parts by weight of ethylene copolymer (B-2) was uniformly mixed into 100 parts by weight of PPS (A-1) obtained in Synthesis Example 1, beforehand, and the resulting mixture was put into the hopper of a twin-screw extruder (The Japan Steel Works, Ltd., (trade name) TEX25αIII) heated to a cylinder temperature of 310° C. Separately, glass fiber (C-2) was put into the twin-screw extruder through the hopper of a side feeder in such a manner that the amount of the glass fiber would be 75 parts by weight per 100 parts by weight of PPS (A-1). By melting and kneading the materials together, a pelletized poly(p-phenylene sulfide) resin composition was produced.

The resulting stainless steel (SUS316) plates and stainless steel (SUS316) lid were set in a mold, and the poly(p-phenylene sulfide) resin composition was injection-molded using an injection molding machine (Sumitomo Heavy Industries, Ltd., (trade name) SE75S) at a cylinder temperature of 310° C. and a mold temperature of 155° C. with the mold hold pressure set to 70 MPa. Through this, insert molding into the shape illustrated in FIG. 4 was performed, and a lid that was a stainless steel (SUS316) member-polyarylene sulfide resin member complex was produced. Then, using the resulting lid that was a stainless steel (SUS316) member-polyarylene sulfide resin member complex, Rz1, Ra1 and Rq1 were measured with an atomic force microscope. Then, after the stainless steel (SUS316) member alone was dissolved by immersing the complex in a bath with a 10% concentration aqueous solution of hydrochloric acid in it, Rz2, Ra2 and Rq2 of the bonding surface were measured with an atomic force microscope.

The values of |(Rz1−Rz2)|/(Rz1+Rz2), |(Ra1−Ra2)|/(Ra1+Ra2) and |(Rq1−Rq2)|/(Rq1+Rq2) were calculated, with the result that all were 0.2 or less. Then, as a result of airtightness evaluation for the stainless steel (SUS316) member-PPS resin member complex, the complex was found to be superior in airtightness, with no bubble formation observed. The results are presented in Table 1.

Example 4

Copper (C1100) plates in the shape illustrated in FIG. 3 (50 mm×10 mm×1 mm thick) and a copper (C1100) lid in the shape illustrated in FIG. 2 were immersed for 5 minutes in a degreasing bath with an aqueous solution containing 7.5% degreasing agent for aluminum (solution temperature, 60° C.) in it and washed with deionized water. Then the plates and lid were immersed for 1 minute in a bath with an aqueous solution containing 1.5% sodium hydroxide (solution temperature, 40° C.) in it and washed with deionized water. Then the plates and lid were immersed for 1 minute in a bath with a 10% concentration aqueous solution of nitric acid (solution temperature, 40° C.) in it, washed with deionized water, then immersed for 10 minutes in a bath with a 3% concentration aqueous solution of nitric acid (solution temperature, 40° C.) in it and washed with deionized water. Then the plates and lid were immersed for 35 minutes in a bath with an aqueous solution containing 2% potassium permanganate and 3% potassium hydroxide (solution temperature, 70° C.) in it, washed with deionized water, then immersed for 10 minutes in a bath with an aqueous solution containing 5% sodium chlorite and 10% sodium hydroxide (solution temperature, 55° C.) in it, washed with deionized water and then dried in a warm-air drying oven. Through this, copper (C1100) plates and a copper (C1100) lid surface-roughened by chemical treatment were obtained.

10 parts by weight of ethylene copolymer (B-2) was uniformly mixed into 100 parts by weight of PPS (A-2), obtained in Synthesis Example 2, beforehand, and the resulting mixture was put into the hopper of a twin-screw extruder (The Japan Steel Works, Ltd., (trade name) TEX25αIII) heated to a cylinder temperature of 300° C. Separately, glass fiber (C-1) was put into the twin-screw extruder through the hopper of a side feeder in such a manner that the amount of the glass fiber would be 15 parts by weight per 100 parts by weight of PPS (A-2). By melting and kneading the materials together, a pelletized poly(p-phenylene sulfide) resin composition was produced.

The resulting copper (C1100) plates and copper (C1100) lid were set in a mold, and the poly(p-phenylene sulfide) resin composition was injection-molded using an injection molding machine (Sumitomo Heavy Industries, Ltd., (trade name) SE75S) at a cylinder temperature of 300° C. and a mold temperature of 150° C. with the mold hold pressure set to 50 MPa. Through this, insert molding into the shape illustrated in FIG. 4 was performed, and a lid that was a copper (C1100) member-polyarylene sulfide resin member complex was produced. Then, using the resulting lid that was a copper (C1100) member-polyarylene sulfide resin member complex, Rz1, Ra1 and Rq1 were measured with an atomic force microscope. Then, after the copper (C1100) member alone was dissolved by immersing the complex in a bath with a 10% concentration aqueous solution of hydrochloric acid in it, Rz2, Ra2 and Rq2 of the bonding surface were measured with an atomic force microscope.

The values of |(Rz1−Rz2)|/(Rz1+Rz2), |(Ra1−Ra2)|/(Ra1+Ra2) and |(Rq1−Rq2)|/(Rq1+Rq2) were calculated, with the result that all were 0.2 or less. Then, as a result of airtightness evaluation for the copper (C1100) member-PPS resin member complex, the complex was found to be superior in airtightness, with no bubble formation observed. The results are presented in Table 1.

Example 5

10 parts by weight of ethylene copolymer (B-1) was uniformly mixed into 100 parts by weight of PPS (A-2), obtained in Synthesis Example 2, beforehand, and the resulting mixture was put into the hopper of a twin-screw extruder (The Japan Steel Works, Ltd., (trade name) TEX25αIII) heated to a cylinder temperature of 280° C. By melting and kneading the materials together, a pelletized poly(p-phenylene sulfide) resin composition was produced.

Surface-roughened aluminum alloy (A5052) plates and a surface-roughened aluminum alloy (A5052) lid obtained in the same manner as in Example 1 were set in a mold, and the poly(p-phenylene sulfide) resin composition was injection-molded using an injection molding machine (Sumitomo Heavy Industries, Ltd., (trade name) SE75S) at a cylinder temperature of 285° C. and a mold temperature of 150° C. with the mold hold pressure set to 50 MPa. Through this, insert molding into the shape illustrated in FIG. 4 was performed, and a lid that was an aluminum alloy (A5052) member-polyarylene sulfide resin member complex was produced. Then, using the resulting lid that was an aluminum alloy (A5052) member-polyarylene sulfide resin member complex, Rz1, Ra1 and Rq1 were measured with an atomic force microscope. Then, after the aluminum alloy (A5052) member alone was dissolved by immersing the complex in a bath with a 10% concentration aqueous solution of hydrochloric acid in it, Rz2, Ra2 and Rq2 of the bonding surface were measured with an atomic force microscope.

The values of |(Rz1−Rz2)|/(Rz1+Rz2), |(Ra1−Ra2)|/(Ra1+Ra2) and |(Rq1−Rq2)|/(Rq1+Rq2) were calculated, with the result that all were 0.2 or less. Then, as a result of airtightness evaluation for the aluminum alloy (A5052) member-PPS resin member complex, the complex was found to be superior in airtightness, with no bubble formation observed. The results are presented in Table 1.

Comparative Example 1

A PPS resin composition, and aluminum alloy (A5052) plates and an aluminum alloy (A5052) lid surface-roughened by chemical treatment, were obtained by the same method as in Example 1, except that no ethylene copolymer was mixed in. Using them, a complex was produced by the same method as in Example 1. Using the resulting complex, Rz1, Ra1, Rq1, Rz2, Ra2 and Rq2 were measured with an atomic force microscope.

The values of |(Rz1−Rz2)|/(Rz1+Rz2), |(Ra1−Ra2)|/(Ra1+Ra2) and |(Rq1−Rq2)|/(Rq1+Rq2) were calculated, with the result that all exceeded 0.2. Then airtightness evaluation was performed, with the result that the complex was found to be inferior in airtightness, with bubble formation observed. The results are presented in Table 2.

Comparative Example 2

A PPS resin composition, and aluminum die-cast alloy (ADC12) plates and an aluminum die-cast alloy (ADC12) lid surface-roughened by chemical treatment, were obtained by the same method as in Example 2, except that no ethylene copolymer was mixed in. Using them, a complex was produced by the same method as in Example 2. Using the resulting complex, Rz1, Ra1, Rq1, Rz2, Ra2 and Rq2 were measured with an atomic force microscope.

The values of |(Rz1−Rz2)|/(Rz1+Rz2), |(Ra1−Ra2)|/(Ra1+Ra2) and |(Rq1−Rq2)|/(Rq1+Rq2) were calculated, with the result that all exceeded 0.2. Then airtightness evaluation was performed, with the result that the complex was found to be inferior in airtightness, with bubble formation observed. The results are presented in Table 2.

Comparative Examples 3 to 5

A PPS resin composition, and stainless steel (SUS316) plates and a stainless steel (SUS316) lid surface-roughened by chemical treatment, were obtained by the same method as in Example 3. Using them, a complex was produced by the same method as in Example 3, except that the mold temperature and the mold hold pressure were changed to the conditions indicated in Table 2. Using the resulting complex, Rz1, Ra1, Rq1, Rz2, Ra2 and Rq2 were measured with an atomic force microscope.

The values of |(Rz1−Rz2)|/(Rz1+Rz2), |(Ra1−Ra2)|/(Ra1+Ra2) and |(Rq1−Rq2)|/(Rq1+Rq2) were calculated,

TABLE 1

| | | Unit | Example 1 | Example 2 | Example 3 | Example 4 | Example 5 |
|---|---|---|---|---|---|---|---|
| Formula | Polyarylene sulfide (A) | Parts | | | | | |
| | PPS (A-1) | by | | | 100 | | |
| | PPS (A-2) | weight | 100 | | | 100 | 100 |
| | PPS (A-3) | | | 100 | | | |
| | Modified ethylene copolymer (B) | | | | | | |
| | Ethylene copolymer (B-1) | | 11 | 7 | | | 10 |
| | Ethylene copolymer (B-2) | | | | 8 | 10 | |
| | Glass fiber | | | | | | |
| | Glass fiber (C-1) | | 25 | | | 15 | |
| | Glass fiber (C-2) | | | 100 | 75 | | |
| Molding | Mold temperature | ° C. | 150 | 150 | 155 | 150 | 150 |
| conditions | Mold hold pressure | MPa | 60 | 50 | 70 | 50 | 50 |
| Evaluations | Rz1 | nm | 191 | 705 | 177 | 190 | 191 |
| | |(Ra1 − Ra2)|/(Ra1 + Ra2) | — | 0.04 | 0.1 | 0.1 | 0.09 | 0.05 |
| | |(Rz1 − Rz2)|/(Rz1 + Rz2) | — | 0.15 | 0.12 | 0.13 | 0.08 | 0.12 |
| | |(Rq1 − Rq2)|/(Rq1 + Rq2) | — | 0.15 | 0.14 | 0.14 | 0.09 | 0.13 |
| | Evaluation of airtightness | — | ○ | ○ | ○ | ○ | ○ | with the result that all exceeded 0.2. Then airtightness evaluation was performed, with the result that the complex was found to be inferior in airtightness, with bubble formation observed. The results are presented in Table 2.

scanning microscope. Then, after the aluminum alloy (A5052) member alone was dissolved by immersing the complex in a bath with a 10% concentration aqueous solution of hydrochloric acid in it, Rz2, Ra2 and Rq2 of the

TABLE 2

|  |  | Unit | Comparative Example 1 | Comparative Example 2 | Comparative Example 3 | Comparative Example 4 | Comparative Example 5 |
|---|---|---|---|---|---|---|---|
| Formula | Polyarylene sulfide (A) | Parts by weight |  |  |  |  |  |
|  | PPS (A-1) |  |  |  | 100 | 100 | 100 |
|  | PPS (A-2) |  | 100 |  |  |  |  |
|  | PPS (A-3) |  |  | 100 |  |  |  |
|  | Modified ethylene copolymer (B) |  |  |  |  |  |  |
|  | Ethylene copolymer (B-1) |  |  |  |  |  |  |
|  | Ethylene copolymer (B-2) |  |  |  | 8 | 8 | 8 |
|  | Glass fiber |  |  |  |  |  |  |
|  | Glass fiber (C-1) |  | 25 |  |  |  |  |
|  | Glass fiber (C-2) |  |  | 100 | 75 | 75 | 75 |
| Molding conditions | Mold temperature | ° C. | 150 | 150 | 100 | 120 | 130 |
|  | Mold hold pressure | MPa | 60 | 50 | 60 | 15 | 0 |
| Evaluations | Rz1 | nm | 191 | 689 | 170 | 170 | 170 |
|  | \|(Ra1 − Ra2)\|/(Ra1 + Ra2) | — | 0.33 | 0.3 | 0.28 | 0.31 | 0.28 |
|  | \|(Rz1 − Rz2)\|/(Rz1 + Rz2) | — | 0.35 | 0.29 | 0.33 | 0.29 | 0.29 |
|  | \|(Rq1 − Rq2)\|/(Rq1 + Rq2) | — | 0.31 | 0.28 | 0.25 | 0.31 | 0.32 |
|  | Evaluation of airtightness | — | x | x | x | x | x |

Example 6

Aluminum alloy (A5052) plates in the shape illustrated in FIG. 3 (50 mm×10 mm×1 mm thick) and an aluminum alloy (A5052) lid in the shape illustrated in FIG. 2 were immersed for 5 minutes in a degreasing bath with an aqueous solution containing 7.5% degreasing agent for aluminum (solution temperature, 60° C.) in it and washed with deionized water. Then the plates and lid were immersed for 2 minutes in a bath with an aqueous solution (30° C.) in which sulfuric acid, ferric chloride, cupric chloride and deionized water had been mixed in a ratio by weight of 8.2:7.8:0.4:83.6, washed with deionized water and then dried in a warm-air drying oven. Through this, aluminum alloy (A5052) plates and an aluminum alloy (A5052) lid surface-roughened by chemical treatment were obtained.

13 parts by weight of ethylene copolymer (B-1) was uniformly mixed into 100 parts by weight of PPS (A-1), obtained in Synthesis Example 1, beforehand, and the resulting mixture was put into the hopper of a twin-screw extruder (The Japan Steel Works, Ltd., (trade name) TEX25αIII) heated to a cylinder temperature of 300° C. Separately, glass fiber (C-1) was put into the twin-screw extruder through the hopper of a side feeder in such a manner that the amount of the glass fiber would be 23 parts by weight per 100 parts by weight of PPS (A-1). By melting and kneading the materials together, a pelletized poly(p-phenylene sulfide) resin composition was produced.

The resulting aluminum alloy (A5052) plates and aluminum alloy (A5052) lid were set in a mold, and the poly(p-phenylene sulfide) resin composition was injection-molded using an injection molding machine (Sumitomo Heavy Industries, Ltd., (trade name) SE75S) at a cylinder temperature of 310° C. and a mold temperature of 150° C. with the mold hold pressure set to 50 MPa. Through this, insert molding into the shape illustrated in FIG. 4 was performed, and a lid that was an aluminum alloy (A5052) member-polyarylene sulfide resin member complex was produced. Then, using the resulting lid that was an aluminum alloy (A5052) member-polyarylene sulfide resin member complex, Rz1, Ra1 and Rq1 were measured with a confocal laser scanning microscope. The values of |(Rz1−Rz2)|/(Rz1+Rz2), |(Ra1-Ra2)|/(Ra1+Ra2) and |(Rq1-Rq2)|/(Rq1+Rq2) were calculated, with the result that all were 0.2 or less. Then, as a result of airtightness evaluation for the aluminum alloy (A5052) member-PPS resin member complex, the complex was found to be superior in airtightness, with no bubble formation observed. The results are presented in Table 3.

Example 7

Aluminum die-cast alloy (ADC12) plates in the shape illustrated in FIG. 3 (50 mm×10 mm×1 mm thick) and an aluminum die-cast alloy (ADC12) lid in the shape illustrated in FIG. 2 were continuously irradiated with continuous-wave laser light using a single-mode fiber laser as the laser oscillator under the conditions of a power of 274 W, a wavelength of 1070 nm, a laser irradiation rate of 10000 mm/sec and a line separation of 0.05 mm. Through this, aluminum die-cast alloy (ADC12) plates and an aluminum die-cast alloy (ADC12) lid surface-roughened by physical treatment were obtained. Then Rz1, Ra1 and Rq1 of a roughened portion of the surface of the resulting aluminum die-cast alloy (ADC12) plates and aluminum die-cast alloy (ADC12) lid were measured with a confocal laser scanning microscope.

8 parts by weight of ethylene copolymer (B-2) was uniformly mixed into 100 parts by weight of PPS (A-3), obtained in Synthesis Example 3, beforehand, and the resulting mixture was put into the hopper of a twin-screw extruder (The Japan Steel Works, Ltd., (trade name) TEX25αIII) heated to a cylinder temperature of 310° C. Separately, glass fiber (C-2) was put into the twin-screw extruder through the hopper of a side feeder in such a manner that the amount of the glass fiber would be 95 parts by weight per 100 parts by weight of PPS (A-3). By melting and kneading the materials together, a pelletized poly(p-phenylene sulfide) resin composition was produced.

The resulting aluminum die-cast alloy (ADC12) plates and aluminum die-cast alloy (ADC12) lid were set in a mold, and the poly(p-phenylene sulfide) resin composition was injection-molded using an injection molding machine (Sumitomo Heavy Industries, Ltd., (trade name) SE75S) at a cylinder temperature of 310° C. and a mold temperature of 155° C. with the mold hold pressure set to 60 MPa. Through this, insert molding into the shape illustrated in FIG. 4 was performed, and a lid that was an aluminum die-cast alloy (ADC12) member-polyarylene sulfide resin member complex was produced. Then, after the aluminum die-cast alloy (ADC12) member alone was dissolved by immersing the resulting aluminum die-cast alloy (ADC12) member-polyarylene sulfide resin member complex in a bath with a 10% concentration aqueous solution of hydrochloric acid in it, Rz2, Ra2 and Rq2 of the bonding surface were measured with a confocal laser scanning microscope. The values of $|(Rz1-Rz2)|/(Rz1+Rz2)$, $|(Ra1-Ra2)|/(Ra1+Ra2)$ and $|(Rq1-Rq2)|/(Rq1+Rq2)$ were calculated, with the result that all were 0.2 or less. Then, as a result of airtightness evaluation for the aluminum die-cast alloy (ADC12) member-PPS resin member complex, the complex was found to be superior in airtightness, with no bubble formation observed. The results are presented in Table 3.

Example 8

Stainless steel (SUS304) plates in the shape illustrated in FIG. 3 (50 mm×10 mm×1 mm thick) and a stainless steel (SUS304) lid in the shape illustrated in FIG. 2 were immersed for 5 minutes in a degreasing bath with an aqueous solution containing 7.5% degreasing agent for aluminum (solution temperature, 60° C.) in it and washed with deionized water. Then the plates and lid were immersed for 13 minutes in a bath with an aqueous solution (53° C.) in which a 35% concentration aqueous solution of hydrochloric acid, a 38% concentration aqueous solution of ferric chloride, an aqueous solution of manganese chloride tetrahydrate, a 40% aqueous solution of a 2-alkyl-N-carboxymethyl-N-hydroxyethylimidazolium betaine and deionized water had been mixed in a ratio by weight of 11:48:1:0.05:39.95, washed with deionized water and then dried in a warm-air drying oven. Through this, stainless steel (SUS304) plates and a stainless steel (SUS304) lid surface-roughened by chemical treatment were obtained.

9 parts by weight of ethylene copolymer (B-1) was uniformly mixed into 100 parts by weight of PPS (A-3), obtained in Synthesis Example 3, beforehand, and the resulting mixture was put into the hopper of a twin-screw extruder (The Japan Steel Works, Ltd., (trade name) TEX25αIII) heated to a cylinder temperature of 310° C. Separately, glass fiber (C-2) was put into the twin-screw extruder through the hopper of a side feeder in such a manner that the amount of the glass fiber would be 70 parts by weight per 100 parts by weight of PPS (A-3). By melting and kneading the materials together, a pelletized poly(p-phenylene sulfide) resin composition was produced.

The resulting stainless steel (SUS304) plates and stainless steel (SUS304) lid were set in a mold, and the poly(p-phenylene sulfide) resin composition was injection-molded using an injection molding machine (Sumitomo Heavy Industries, Ltd., (trade name) SE75S) at a cylinder temperature of 310° C. and a mold temperature of 155° C. with the mold hold pressure set to 60 MPa. Through this, insert molding into the shape illustrated in FIG. 4 was performed, and a lid that was a stainless steel (SUS304) member-polyarylene sulfide resin member complex was produced. Then, using the resulting lid that was a stainless steel (SUS304) member-polyarylene sulfide resin member complex, Rz1, Ra1 and Rq1 were measured with a confocal laser scanning microscope. Then, after the stainless steel (SUS304) member alone was dissolved by immersing the complex in a bath with a 10% concentration aqueous solution of hydrochloric acid in it, Rz2, Ra2 and Rq2 of the bonding surface were measured with a confocal laser scanning microscope. The values of $|(Rz1-Rz2)|/(Rz1+Rz2)$, $|(Ra1-Ra2)|/(Ra1+Ra2)$ and $|(Rq1-Rq2)|/(Rq1+Rq2)$ were calculated, with the result that all were 0.2 or less. Then, as a result of airtightness evaluation for the stainless steel (SUS304) member-PPS resin member complex, the complex was found to be superior in airtightness, with no bubble formation observed. The results are presented in Table 3.

Example 9

Copper (C1100) plates in the shape illustrated in FIG. 3 (50 mm×10 mm×1 mm thick) and a copper (C1100) plate in the shape illustrated in FIG. 2 were irradiated with laser light using a fiber laser (Keyence Corporation, (trade name) MD-F3200) as the laser oscillator under the conditions of a power of 24 W, a wavelength of 1090 nm, a pulse frequency of 60 kHz, a laser irradiation rate of 2000 mm/sec and a line separation of 0.05 mm. Through this, copper (C1100) plates and a copper (C1100) lid surface-roughened by physical treatment were obtained. Then Rz1, Ra1 and Rq1 of a roughened portion of the surface of the resulting copper (C1100) plates and copper (C1100) lid were measured with a confocal laser scanning microscope.

12 parts by weight of ethylene copolymer (B-1) was uniformly mixed into 100 parts by weight of PPS (A-1), obtained in Synthesis Example 1, beforehand, and the resulting mixture was put into the hopper of a twin-screw extruder (The Japan Steel Works, Ltd., (trade name) TEX25αIII) heated to a cylinder temperature of 300° C. Separately, glass fiber (C-1) was put into the twin-screw extruder through the hopper of a side feeder in such a manner that the amount of the glass fiber would be 15 parts by weight per 100 parts by weight of PPS (A-1). By melting and kneading the materials together, a pelletized poly(p-phenylene sulfide) resin composition was produced.

The resulting copper (C1100) plates and copper (C1100) lid were set in a mold, and the poly(p-phenylene sulfide) resin composition was injection-molded using an injection molding machine (Sumitomo Heavy Industries, Ltd., (trade name) SE75S) at a cylinder temperature of 300° C. and a mold temperature of 145° C. with the mold hold pressure set to 55 MPa. Through this, insert molding into the shape illustrated in FIG. 4 was performed, and a lid that was a copper (C1100) member-polyarylene sulfide resin member complex was produced. Then, after the copper (C1100) member alone was dissolved by immersing the complex in a bath with a 10% concentration aqueous solution of hydrochloric acid in it, Rz2, Ra2 and Rq2 of the bonding surface were measured with a confocal laser scanning microscope. The values of $|(Rz1-Rz2)|/(Rz1+Rz2)$, $|(Ra1-Ra2)|/(Ra1+Ra2)$ and $|(Rq1-Rq2)|/(Rq1+Rq2)$ were calculated, with the result that all were 0.2 or less. Then, as a result of airtightness evaluation for the copper (C1100) member-PPS resin member complex, the complex was found to be superior in airtightness, with no bubble formation observed. The results are presented in Table 3.

Example 10

8 parts by weight of ethylene copolymer (B-1) was uniformly mixed into 100 parts by weight of PPS (A-2), obtained in Synthesis Example 2, beforehand, and the resulting mixture was put into the hopper of a twin-screw extruder (The Japan Steel Works, Ltd., (trade name) TEX25αIII) heated to a cylinder temperature of 280° C. By melting and kneading the materials together, a pelletized poly(p-phenylene sulfide) resin composition was produced.

Surface-roughened aluminum alloy (A5052) plates and a surface-roughened aluminum alloy (A5052) lid obtained in the same manner as in Example 6 were set in a mold, and the poly(p-phenylene sulfide) resin composition was injection-molded using an injection molding machine (Sumitomo Heavy Industries, Ltd., (trade name) SE75S) at a cylinder temperature of 300° C. and a mold temperature of 150° C. with the mold hold pressure set to 55 MPa. Through this, insert molding into the shape illustrated in FIG. 4 was performed, and a lid that was an aluminum alloy (A5052) member-polyarylene sulfide resin member complex was produced. Then, using the resulting lid that was an aluminum alloy (A5052) member-polyarylene sulfide resin member complex, Rz1, Ra1 and Rq1 were measured with a confocal laser scanning microscope. Then, after the aluminum alloy (A5052) member alone was dissolved by immersing the complex in a bath with a 10% concentration aqueous solution of hydrochloric acid in it, Rz2, Ra2 and Rq2 of the bonding surface were measured with a confocal laser scanning microscope. The values of |(Rz1−Rz2)|/(Rz1+Rz2), |(Ra1−Ra2)|/(Ra1+Ra2) and |(Rq1−Rq2)|/(Rq1+Rq2) were calculated, with the result that all were 0.2 or less. Then, as a result of airtightness evaluation for the aluminum alloy (A5052) member-PPS resin member complex, the complex was found to be superior in airtightness, with no bubble formation observed. The results are presented in Table 3.

Comparative Example 6

A PPS resin composition, and surface-roughened aluminum alloy (A5052) plates and a surface-roughened aluminum alloy (A5052) lid, were obtained by the same method as in Example 6, except that no ethylene copolymer was mixed in. Using them, a complex was produced by the same method as in Example 6. Using the resulting complex, Rz1, Ra1, Rq1, Rz2, Ra2 and Rq2 were measured with a confocal laser scanning microscope. The values of |(Rz1−Rz2)|/(Rz1+Rz2), |(Ra1−Ra2)|/(Ra1+Ra2) and |(Rq1-Rq2)|/(Rq1+Rq2) were calculated, with the result that all exceeded 0.2. Then airtightness evaluation was performed, with the result that the complex was found to be inferior in airtightness, with bubble formation observed. The results are presented in Table 4.

Comparative Examples 7 to 9

A resin composition, and surface-roughened aluminum alloy (A5052) plates and a surface-roughened aluminum alloy (A5052) lid, were obtained by the same method as in Example 6, except that PPS (A-1), obtained in Synthesis Example 1, was changed to PE (F-1), PBT (D-1) or PA (E-1) and that the cylinder temperature of the twin-screw extruder was changed to the condition indicated in Table 4. Using them, a complex was produced by the same method as in Example 6, except that the cylinder temperature, mold temperature and mold hold pressure of the injection molding machine were changed to the conditions indicated in Table 4. Using the resulting complex, Rz1, Ra1, Rq1, Rz2, Ra2 and Rq2 were measured with a confocal laser scanning microscope. The values of |(Rz1−Rz2)|/(Rz1+Rz2), |(Ra1−Ra2)|/(Ra1+Ra2) and |(Rq1−Rq2)|/(Rq1+Rq2) were calculated, with the result that all exceeded 0.2. Then airtightness evaluation was performed, with the result that the complex was found to be inferior in airtightness, with bubble formation observed. The results are presented in Table 4.

Comparative Examples 10 to 12

A PPS resin composition, and surface-roughened stainless steel (SUS304) plates and a surface-roughened stainless steel (SUS304) lid, were obtained by the same method as in Example 8. Using them, a complex was produced by the same method as in Example 8, except that the mold temperature and the mold hold pressure were changed to the conditions indicated in Table 4. Using the resulting complex, Rz1, Ra1, Rq1, Rz2, Ra2 and Rq2 were measured with a confocal laser scanning microscope. The values of |(Rz1−Rz2)|/(Rz1+Rz2), |(Ra1−Ra2)|/(Ra1+Ra2) and |(Rq−Rq2)|/(Rq1+Rq2) were calculated, with the result that all exceeded 0.2. Then airtightness evaluation was performed, with the result that the complex was found to be inferior in airtightness, with bubble formation observed. The results are presented in Table 4.

TABLE 3

| | | Unit | Example 6 | Example 7 | Example 8 | Example 9 | Example 10 |
|---|---|---|---|---|---|---|---|
| Formula | Polyarylene sulfide (A) | Parts by weight | | | | | |
| | PPS (A-1) | | 100 | | | 100 | |
| | PPS (A-2) | | | | | | 100 |
| | PPS (A-3) | | | 100 | 100 | | |
| | Modified ethylene copolymer (B) | | | | | | |
| | Ethylene copolymer (B-1) | | 13 | | 9 | 12 | 8 |
| | Ethylene copolymer (B-2) | | | 8 | | | |
| | Glass fiber | | | | | | |
| | Glass fiber (C-1) | | 23 | | | 15 | |
| | Glass fiber (C-2) | | | 95 | 70 | | |
| Molding conditions | Mold temperature | ° C. | 150 | 155 | 155 | 145 | 150 |
| | Mold hold pressure | MPa | 50 | 60 | 60 | 55 | 55 |
| Evaluations | Rz1 | μm | 95 | 445 | 56 | 193 | 93 |
| | |(Ra1 − Ra2)|/(Ra1 + Ra2) | — | 0.03 | 0.15 | 0.09 | 0.15 | 0.06 |
| | |(Rz1 − Rz2)|/(Rz1 + Rz2) | — | 0.09 | 0.05 | 0.11 | 0.14 | 0.13 |
| | |(Rq1 − Rq2)|/(Rq1 + Rq2) | — | 0.1 | 0.16 | 0.12 | 0.08 | 0.11 |
| | Evaluation of airtightness | — | ○ | ○ | ○ | ○ | ○ |

TABLE 4

| | | Unit | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|
| Formula | Polyarylene sulfide (A) | Parts by weight | | | | | | | |
| | PPS (A-1) | | 100 | | | | | | |
| | PPS (A-3) | | | | | | 100 | 100 | 100 |
| | PE (F-1) | | | 100 | | | | | |
| | PBT (D-1) | | | | 100 | | | | |
| | PA (E-1) | | | | | 100 | | | |
| | Modified ethylene copolymer (B) | | | | | | | | |
| | Ethylene copolymer (B-1) | | | 13 | 13 | 13 | 9 | 9 | 9 |
| | Glass fiber | | | | | | | | |
| | Glass fiber (C-1) | | 23 | 23 | 23 | 23 | | | |
| | Glass fiber (C-2) | | | | | | 70 | 70 | 70 |
| Melting and kneading conditions | Cylinder temperature | °C. | 300 | 190 | 200 | 280 | 300 | 300 | 300 |
| Molding conditions | Cylinder temperature | °C. | 310 | 200 | 210 | 290 | 310 | 310 | 310 |
| | Mold temperature | °C. | 150 | 60 | 120 | 80 | 100 | 120 | 135 |
| | Mold hold pressure | MPa | 50 | 65 | 60 | 60 | 55 | 10 | 0 |
| Evaluations | Rz1 | μm | 94 | 98 | 98 | 98 | 51 | 51 | 51 |
| | \|(Ra1 − Ra2)\|/(Ra1 + Ra2) | — | | 0.28 | 0.36 | 0.28 | 0.25 | 0.25 | 0.22 | 0.21 |
| | \|(Rz1 − Rz2)\|/(Rz1 + Rz2) | — | | 0.29 | 0.41 | 0.22 | 0.28 | 0.33 | 0.24 | 0.23 |
| | \|(Rq1 − Rq2)\|/(Rq1 + Rq2) | — | | 0.26 | 0.55 | 0.3 | 0.21 | 0.31 | 0.29 | 0.22 |
| | Evaluation of airtightness | — | x | x | x | x | x | x | x |

While the present invention has been described in detail and with reference to specific embodiments, it is apparent to one skilled in the art that various changes and modifications can be made without departing from the nature and scope of the present invention.

It should be noted that the entire contents of the claims, description, drawings and abstract of Japanese Patent Application No. 2022-000312, filed on Jan. 4, 2022, are incorporated herein by reference as a disclosure of the description of the present invention.

INDUSTRIAL APPLICABILITY

The complex according to the present invention provides a metal member-polyarylene sulfide resin member complex that has no defects such as voids in the bonding interface, is superior in airtightness at the bonding interface and also is superior in impact resistance, lightness and suitability for mass production and is particularly useful in, in particular, the application of components of transport equipment, such as automobiles and aircraft, or in the application of electric/electronic components, for example of mobile phones, in which waterproofness is needed.

REFERENCE SYMBOLS

1; A metallic plate.
2; A metallic plate.
3; A metallic lid.
4; A PPS resin member.

The invention claimed is:

1. A metal member-polyarylene sulfide resin member complex comprising a metal member and a polyarylene sulfide resin member combined together into a one-piece shaped article by injection molding, wherein (1) and (2) below are satisfied:
  (1) arithmetic mean roughness (Ra1), maximum height roughness (Rz1) and root mean square height (Rq1) of a surface of the metal member in a measurement according to JIS B 0601-2001 performed using an atomic force microscope set to a field of view range of 2 μm or a confocal laser scanning microscope,
  and arithmetic mean roughness (Ra2), maximum height roughness (Rz2) and root mean square height (Rq2) of a surface of the polyarylene sulfide resin member in a measurement according to JIS B 0601-2001 performed using an atomic force microscope set to a field of view range of 2 μm or a confocal laser scanning microscope, satisfy a relationship or relationships of $|(Ra1-Ra2)|/(Ra1+Ra2) \leq 0.2$, $|(Rz1-Rz2)|/(Rz1+Rz2) \leq 0.2$ and/or $|(Rq1-Rq2)|/(Rq1+Rq2) \leq 0.2$, and
  (2) the polyarylene sulfide resin member contains a polyarylene sulfide resin and a modified ethylene copolymer.

2. The metal member-polyarylene sulfide resin member complex according to claim 1, wherein the modified ethylene copolymer is at least one modified ethylene copolymers selected from the group consisting of ethylene-α,β-unsaturated alkyl carboxylate-maleic anhydride copolymers, ethylene-α,β-unsaturated glycidyl carboxylate copolymers, ethylene-α,β-unsaturated glycidyl carboxylate-vinyl acetate copolymers, ethylene-α,β-unsaturated glycidyl carboxylate-α,β-unsaturated alkyl carboxylate copolymers and maleic anhydride-grafted ethylene-α-olefin copolymers.

3. The metal member-polyarylene sulfide resin member complex according to claim 1, wherein (3) below is further satisfied:
  (3) the maximum height roughness (Rz1) of the surface of the metal member in a measurement according to JIS B 0601-2001 performed using an atomic force microscope set to a field of view range of 2 μm is 800 nm or less.

4. The metal member-polyarylene sulfide resin member complex according to claim 1, wherein the metal member is a metal member having a chemically treated surface.

5. The metal member-polyarylene sulfide resin member complex according to claim 1, wherein (4) below is further satisfied:
  (4) the maximum height roughness (Rz1) of the surface of the metal member in a measurement according to JIS B 0601-2001 performed using a confocal laser scanning microscope exceeds 800 nm.

6. The metal member-polyarylene sulfide resin member complex according to claim 5, wherein the metal member is a metal member having a physically treated surface.

7. A production method for the metal member-polyarylene sulfide resin member complex as defined in claim 1, the method comprising installing a metal member in a mold and injecting and filling a molten polyarylene sulfide resin into the mold to produce a one-piece insert-injected complex in which the metal member and a polyarylene sulfide resin member have been directly combined together.

8. The production method according to claim 7 for a metal member-polyarylene sulfide resin member complex, wherein insert injection molding is performed under conditions of a mold temperature of 130° C. or above and a mold hold pressure of 1 MPa or more.

9. A container comprising the metal member-polyarylene sulfide resin member complex as defined in claim 1 as a lid thereof.

10. The container according to claim 9, wherein the container is a highly airtight container.

* * * * *